United States Patent
Jackson et al.

(10) Patent No.: US 11,661,380 B2
(45) Date of Patent: May 30, 2023

(54) MULTI-ENVIRONMENTAL BARRIER COATING, PROCESSES FOR COATING ARTICLES, AND THEIR COATED ARTICLES

(71) Applicant: Raytheon Technologies Corporation, Farmington, CT (US)

(72) Inventors: Richard Wesley Jackson, Mystic, CT (US); James T. Beals, West Hartford, CT (US); Xia Tang, West Hartford, CT (US); Xuan Liu, Glastonbury, CT (US); David A. Litton, West Hartford, CT (US); Brian T. Hazel, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/395,992

(22) Filed: Aug. 6, 2021

(65) Prior Publication Data
US 2023/0044705 A1     Feb. 9, 2023

(51) Int. Cl.
C04B 41/50     (2006.01)
C04B 41/52     (2006.01)
C04B 41/45     (2006.01)

(52) U.S. Cl.
CPC ...... C04B 41/4527 (2013.01); C04B 41/5071 (2013.01); C04B 41/52 (2013.01)

(58) Field of Classification Search
CPC ................................................ C04B 41/5071
See application file for complete search history.

(56) References Cited

U.S. PATENT DOCUMENTS

| 9,428,650 | B2 | 8/2016 | Meschter et al. |
| 2004/0043244 | A1* | 3/2004 | Bruce ............. C23C 28/321 428/697 |
| 2006/0280953 | A1 | 12/2006 | Hazel et al. |
| 2009/0162670 | A1* | 6/2009 | Lau .................. C23C 4/02 428/433 |
| 2013/0157064 | A1 | 6/2013 | Perepezko et al. |
| 2015/0118444 | A1 | 4/2015 | Lipkin et al. |
| 2015/0167141 | A1* | 6/2015 | Rosenzweig ....... C23C 4/067 427/454 |
| 2017/0335118 | A1 | 11/2017 | Tang et al. |
| 2019/0119803 | A1 | 4/2019 | Tang et al. |

OTHER PUBLICATIONS

Extended European Search Report dated Dec. 22, 2022 for corresponding European application 22188845.6.

* cited by examiner

Primary Examiner — David Sample
(74) Attorney, Agent, or Firm — Bachman & LaPointe, P.C.

(57) ABSTRACT

A coated article including an article having a surface; an oxidation resistant bond coat layer deposited on the surface, the oxidation resistant bond coat layer comprising a metal silicide phase, a crystalline ceramic phase and an amorphous ceramic phase, wherein the metal silicide phase has an aspect ratio greater than 1:1 but less than 50:1.

9 Claims, 5 Drawing Sheets

The aspect ratio of silicide ($MoSi_2$) and crystalline oxide ($HfSiO_4$) are greater than 3:1 and in many cases greater than 5:1

The aspect ratio of silicide (MoSi$_2$) and crystalline oxide (HfSiO$_4$) are greater than 3:1 and in many cases greater than 5:1

FIG. 5

MULTI-ENVIRONMENTAL BARRIER COATING, PROCESSES FOR COATING ARTICLES, AND THEIR COATED ARTICLES

BACKGROUND

The present disclosure relates to coatings and, more particularly, to an environmental barrier coating that utilizes a multi-component layer that imparts oxidation protection.

Gas turbine engines and hypersonic engines that are currently being pursued for enhanced performance and improved operational efficiencies will require stable lightweight materials with robust mechanical properties across a wide temperature spectrum. Coatings can increase the durability of hot-section components. The structural materials, such as advanced alloys and composites, in these components can be susceptible to degradation from the combustion gas and the coatings can reduce the severity of this harsh environment. The coating must maintain chemical and mechanical compatibility with the article while imparting both environmental and thermal protection.

SUMMARY

A coated article according to one disclosed non-limiting embodiment of the present disclosure includes an article having a surface; and an oxidation resistant bond coat layer deposited on the surface, the oxidation resistant bond coat layer comprising a metal silicide phase, a crystalline ceramic phase and an amorphous ceramic phase, wherein the metal silicide phase has an aspect ratio greater than 1:1 but less than 50:1.

A further aspect of the present disclosure includes that the metal silicide phase and the crystalline ceramic phase each have an aspect ratio greater than 3:1.

A further aspect of the present disclosure includes that the metal silicide phase and the crystalline ceramic phase each have an aspect ratio greater than 5:1.

A further aspect of the present disclosure includes that a volume fraction of the metal silicide phase ranges between 20-80 vol. %, a volume fraction of the crystalline ceramic phase is 25-75 vol. %, and a volume fraction of the amorphous ceramic phase ranges between 1-30 vol. %.

A further aspect of the present disclosure includes that a volume fraction of the metal silicide phase is 60 vol. % $MoSi_2$, a volume fraction of the crystalline ceramic phase is 25 vol. % $HfSiO_4$, and a volume fraction of the amorphous ceramic phase is 15 vol. % boro-silicate glass where the glass has the composition $(Si_{0.75}B_{0.15}Al_{0.05}Na_{0.05})O_2$ with porosity less than 10%.

A further aspect of the present disclosure includes that a volume fraction of the metal silicide phase is 60 vol. % $MoSi_2$, a volume fraction of the crystalline ceramic phase is 25 vol. % $HfSiO_4$, and 5% $HfB_2$; and a volume fraction of the amorphous ceramic phase is 10 vol. % boro-silicate glass where the glass has the composition $(Si_{0.75}B_{0.15}Al_{0.05}Na_{0.05})O_2$ with porosity less than 10%.

A further aspect of the present disclosure includes an environmental protective top coat layer disposed upon the oxidation resistant bond coat layer, whereby the oxidation resistant bond coat layer is operable to repair a crack in the environmental protective top coat layer during operation of the coated article.

A further aspect of the present disclosure includes that the metal silicide phase has an aspect ratio greater than 3:1.

A further aspect of the present disclosure includes that the metal silicide phase has an aspect ratio greater than 5:1.

A process for applying a coating to an article according to one disclosed non-limiting embodiment of the present disclosure includes mixing a silicide powder, a ceramic powder, and a glass powder to form a mixed powder feedstock; injecting the mixed powder feedstock into a plasma torch that is directed at a surface of the article to at least partially melt the silicide powder, the ceramic powder, and the glass powder; and controlling a particle diameter of the silicide powder, the ceramic powder, and the glass powder to control the extent of the melting to form an oxidation resistant bond coat layer.

A further aspect of the present disclosure includes that a volume fraction of the metal silicide phase ranges between 20-80 vol. %, a volume fraction of the crystalline ceramic phase is 25-75 vol. %, and a volume fraction of the amorphous ceramic phase ranges between 1-30 vol. %.

A further aspect of the present disclosure includes that a volume fraction of the metal silicide phase is 60 vol. % $MoSi_2$, a volume fraction of the crystalline ceramic phase is 25 vol. % $HfSiO_4$, and a volume fraction of the amorphous ceramic phase is 15 vol. % boro-silicate glass where the glass has the composition $(Si_{0.75}B_{0.15}Al_{0.05}Na_{0.05})O_2$ with porosity less than 10%.

A further aspect of the present disclosure includes that a volume fraction of the metal silicide phase is 60 vol. % $MoSi_2$, a volume fraction of the crystalline ceramic phase is 25 vol. % $HfSiO_4$, and 5% $HfB_2$; and a volume fraction of the amorphous ceramic phase is 10 vol. % boro-silicate glass where the glass has the composition $(Si_{0.75}B_{0.15}Al_{0.05}Na_{0.05})O_2$ with porosity less than 10%.

A further aspect of the present disclosure includes that the particle diameter of the ceramic powder is greater than the particle diameter of the silicide powder and the glass powder.

A further aspect of the present disclosure includes that the ceramic powder is melted less than that of the silicide powder and the glass powder.

A further aspect of the present disclosure includes depositing an environmental protective top coat layer upon the oxidation resistant bond coat layer, whereby the oxidation resistant bond coat layer is operable to repair a crack in the environmental protective top coat layer during operation of the coated article.

A process for applying a coating to an article according to one disclosed non-limiting embodiment of the present disclosure includes injecting a silicide powder into a plasma torch that is directed at a surface of the article to at least partially melt the silicide powder; injecting a ceramic powder into the plasma torch that is directed at the surface of the article to at least partially melt the ceramic powder; injecting a glass powder into the plasma torch that is directed at the surface of the article to at least partially melt the glass powder; and controlling a particle diameter of the silicide powder, the ceramic powder, and the glass powder to control the extent of the melting to form an oxidation resistant bond coat layer.

A further aspect of the present disclosure includes that injecting the silicide powder, the ceramic powder, and the glass powder occurs simultaneously.

A further aspect of the present disclosure includes that the silicide powder is injected upstream of the ceramic powder.

A further aspect of the present disclosure includes that the ceramic powder is injected upstream of the glass powder.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
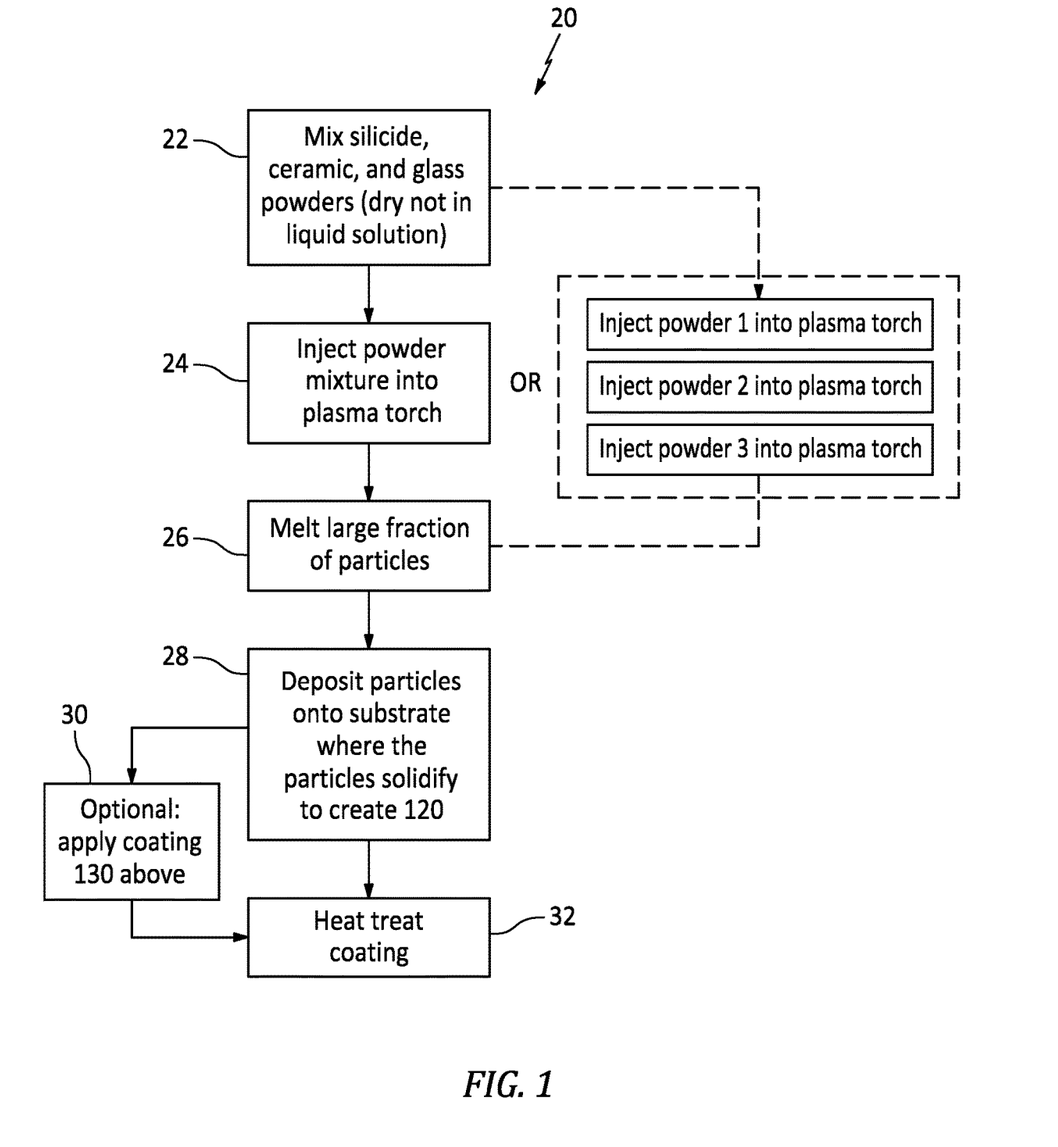
FIG. 1 is a block diagram of a process for applying an environmental barrier coating to an article.

With reference to FIG. 1, a process 20 for applying an environmental barrier coating 100 (FIG. 2) to surface 102 of an article 104 is illustrated in a schematic flowchart form. The environmental barrier coating 100 includes a metal silicide, a crystalline ceramic, and an amorphous ceramic constituent. The volume fraction of each constituent is chosen to optimize a series of properties such as thermal expansion, stiffness, oxidation resistance and protection, and durability. The coating constituents in the form of powders are selected in terms of, for example, particle size and chemistry, along with the deposition conditions to produce the desired coating structure. The article 104 may be manufactured of a ceramic matrix composite (CMC) for use in a hot section of a turbine engine.

In one embodiment, a silicide powder (e.g., molybdenum disilicide, silicon dioxide under ceramic powder or glass), a ceramic powder (e.g., hafnium silicate, hafnium dioxide, hafnium diboride), and a glass powder (e.g., borosilicate glass) are mixed (step 22) in a dry format to form a mixed powder feedstock 200. Suitable mixing processes may include, but are not limited to, mechanical mixing techniques, manual mixing techniques, ultrasonics, cavitation, agitation, and combinations of these techniques, and the like. For example, representative mechanical mixing techniques may include grinding, ball mixing, high energy milling, shear mixing, stirring, centrifugal mixing, and combinations thereof.

In one example, the powder feedstock 200 may be composed of a metal silicide (e.g., $MoSi_2$, $WSi_2$, $VSi_2$); a crystalline oxide (e.g., $HfSiO_4$); and a borosilicate glass (e.g., $(Si_{0.75}B_{0.15}Al_{0.05}Na_{0.5})O_2$. The volume fraction of the silicide phase may range between 20-80 vol. %; the volume fraction of crystalline phase may range between 25-75 vol. %; and 1-30 vol. % amorphous. One disclosed embodiment includes: 60 vol. % Molybdenum disilicide ($MoSi_2$), 25 vol. % Hafnium silicate ($HfSiO_4$), and 15 vol. % boro-silicate glass where the glass has the composition $(Si_{0.75}B_{0.5}Al_{0.05}Na_{0.05})O_2$ with a porosity less than 10%. Another disclosed embodiment includes: 60 vol. % Molybdenum disilicide ($MoSi_2$), 25 vol. % hafnium silicate ($HfSiO_4$), 5% hafnium diboride ($HfB_2$) and 10 vol. % boro-silicate glass where the glass has the composition $(Si_{0.75}B_{0.15}Al_{0.05}Na_{0.05})O_2$ with a porosity less than 10%.

Figure 3:
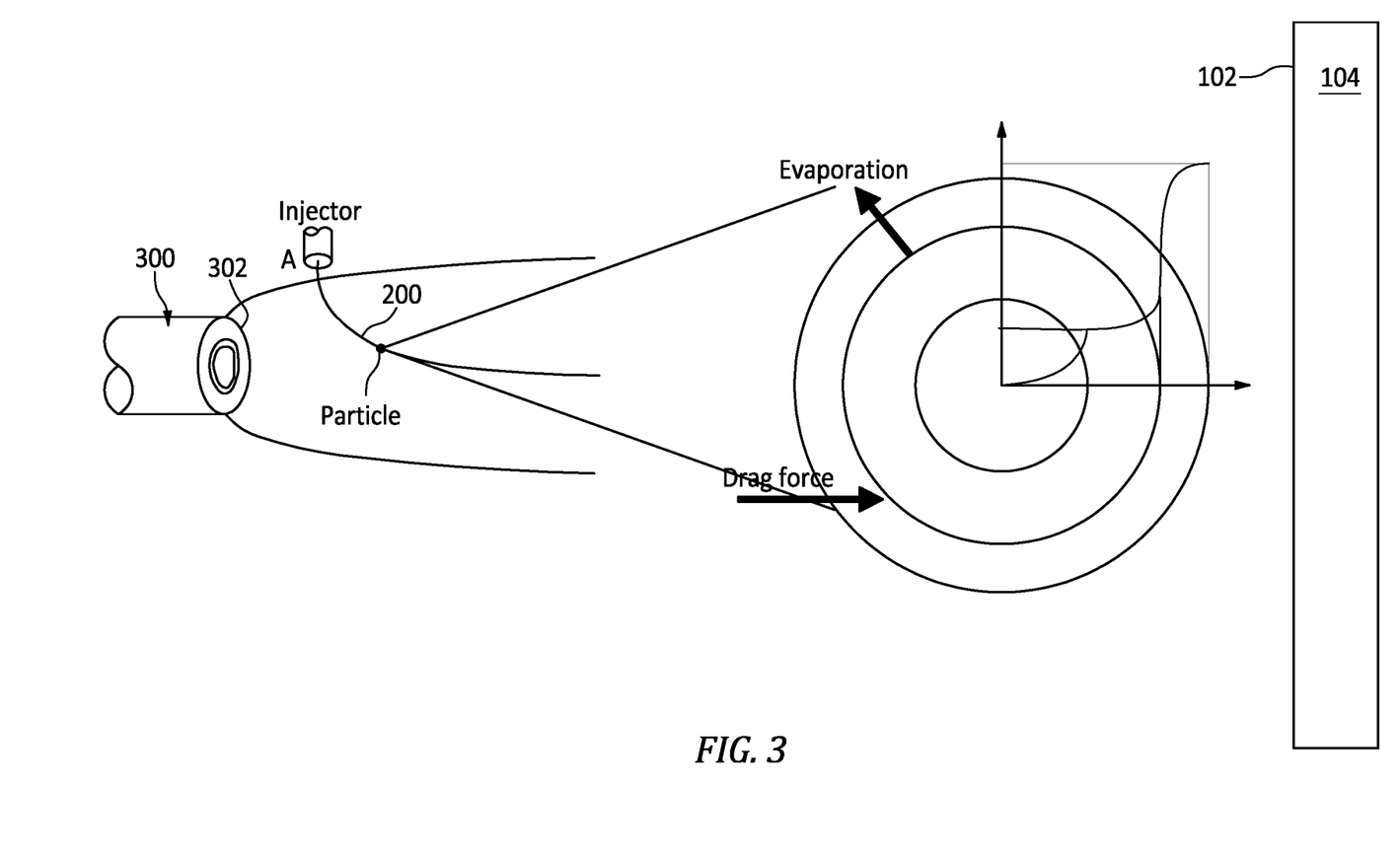
FIG. 3 is a schematic view of the process according to one disclosed non-limiting embodiment.
Figure 4:
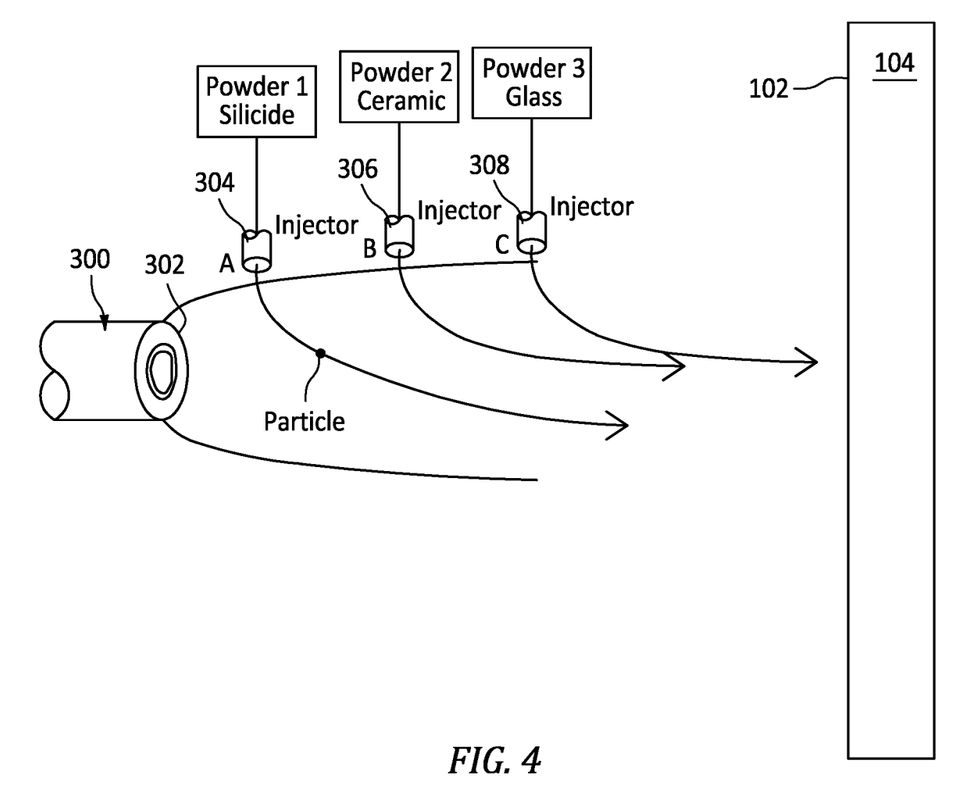
FIG. 4 is a schematic view of the process according to one disclosed non-limiting embodiment.

The mixed powder feedstock 200 is injected (step 24; FIG. 3) into a plasma torch 300 that is directed at the surface 102 of the article 104. In an alternative embodiment, the silicide powder, the ceramic powder, and the glass powder are individually injected into the plasma torch 300 adjacent to a tip 302 thereof (FIG. 4). For example, the silicide powder may be injected through a first injector 304 that is closest to the tip 302, next the ceramic powder is injected through a second injector 306 downstream of the first injector 304, and finally the glass powder is injected through a third injector 306 downstream of the second injector 306 (FIG. 4).

To obtain a desired coating microstructure and properties, a majority of the feedstock particles are melted (step 26) during flight to the surface 102 of the article 104. The power of the plasma torch 300 and the size of the ceramic particles are coordinated such that the desired energy is imparted to the particles to provide a desired melting and thus a desired aspect ratio. A particle melt index (MI) of the particles may be described as follows:

$$MI = \frac{24k_p}{\rho_p \Delta H_{SL}} \frac{1}{1 + \frac{4k_p}{hd_p}} \frac{(T_g - T_m)\Delta t_{fly}}{d_p^2}$$

$$\Delta t_{fly} = \frac{2L}{V},$$

Particle parameters
$k_p$=particle thermal conductivity
h=heat transfer coefficient
$\Delta H_{SL}$=heat to melt particle
$T_g$=gas temperature
$T_m$=particle melting temperature
$\Delta t_{fly}$=resonance time
Torch parameters
$T_f$=flame temperature
h=heat transfer coefficient
V=flame velocity
L=distance between torch and substrate The particle diameter of each feedstock constituent is an extrinsic property that can be controlled to influence the extent of melting and thereby the aspect ratio when applied. That is, more refractory particles may be smaller and less refractory particles may be larger.

Figure 2:
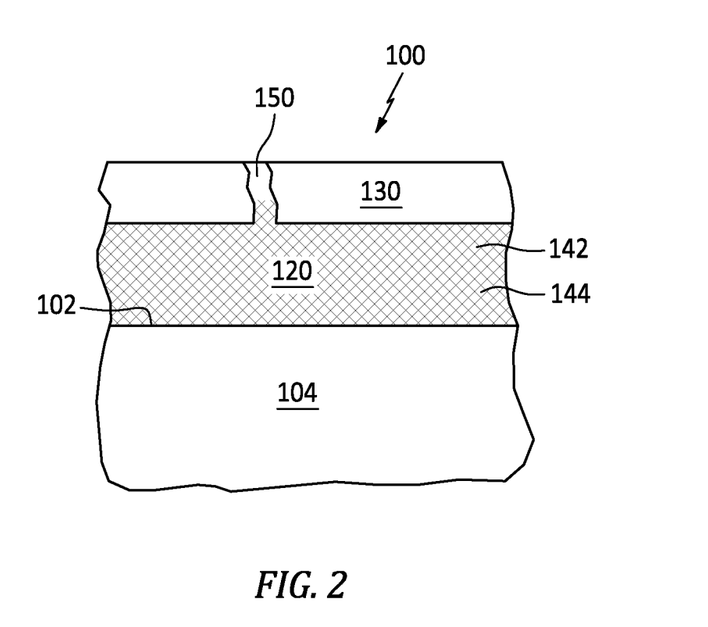
FIG. 2 is a schematic view of an article coated with an environmental barrier coating.

The melted feedstock propelled by the plasma torch 300 impact and solidify on the surface 102 of the article 104 to form an oxidation resistant bond coat layer 120 (step 28; FIG. 2) with particles of a desired aspect ratio. This may be repeated so as to apply more than one layer.

Alternatively, a majority of the silicide and glass particles are melted by the plasma torch 300 during flight but the ceramic (e.g., $HfSiO_4$) particles melt to only a limited extent less than that of the silicide and glass particles. Once melted, the silicate compounds can solidify into an amorphous state and then crystallize during operation which in some instances may be undesirable such larger ceramic particles may be injected into the plasma torch 300 so that relatively limited melting thereof occurs. The molten silicide and glass particles will thereby produce a dense coating.

Figure 5:
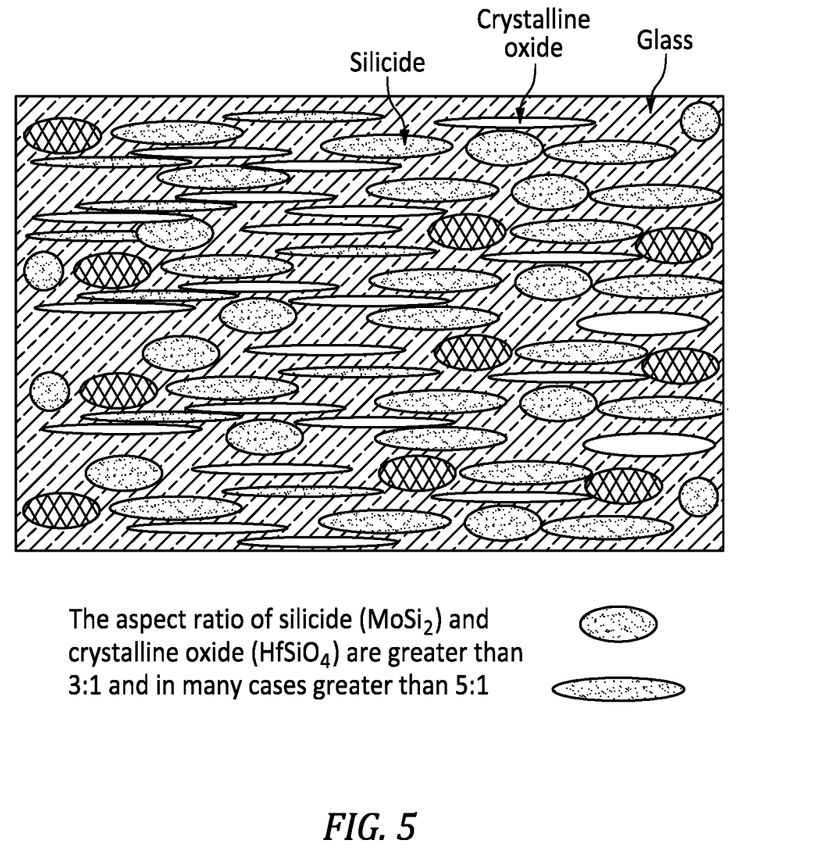
FIG. 5 is a schematic view of an aspect ratio of the constituents utilized in the process.

With reference to FIG. 5, the aspect ratio of the silicide (e.g., $MoSi_2$) and crystalline oxide (e.g., $HfSiO_4$) are typically greater than 3:1. That is, the 3 of the 3:1 aspect ratio describes a major axis of the particle splat generally along the coating substrate interface and the 1 of the 3:1 aspect ratio describes a minor axis that is transverse thereto. Alternatively, the aspect ratio of the silicide (e.g., $MoSi_2$) and crystalline oxide (e.g., $HfSiO_4$) may be greater than 5:1 but less than about 50:1. This would correspond to the case where the $HfSiO4$ particles mostly do not melt during deposition, but the $MoSi2$ particles do melt. An alternative embodiment would be where the $HfSiO4$ melt, so as to have a relatively high aspect ratio, and the $MoSi2$ is mostly un-melted and has a lower aspect ratio. This could be advantageous from an oxidation point of view, such that the aspect ratio of $MoSi2$ is closer to 1:1. The molten or semi-molten particles splat when they strike the substrate creating the aspect ratio before solidifying. They thereby have an orientation with the major axis generally along the coating substrate interface.

In some embodiments, an environmental protective top coat layer 130 may then optionally be applied (step 30) upon the oxidation resistant bond coat layer 120 to impart additional protection from oxidation or steam. The environmental protective top coat layer 130 may be an environmental barrier coating of at least one of, yttrium silicates and rare earth silicates, hafnium silicate, and RE oxides and hafnium oxide for protection against combustion gas in turbine environment. The environmental protective top coat layer 130 may contain a refractory material including oxides, rare earth oxides, metal silicates, rare earth silicates or mixtures thereof. Suitable refractory oxide materials may include, but are not limited to, at least one of the following oxides: $Ta_xO_y$ (where x=1-3 and y=1-5), $Nb_xO_y$ (where x=1-3 and y=1-5), MgO, CaO, SrO, BaO, $SiO_2$, $HfO_2$, $TiO_2$, $ZrO_2$, $Al_2O_3$, $Y_2O_3$, $La_2O_3$, rare earth oxides, $HfSiO4$, $Y2Si2O7$, $Y2SiO5$, rare-earth silicates mixtures thereof, and the like. Suitable coating techniques to apply the environmental protective top coat layer 130 may include, but are not limited to, thermal spraying, chemical vapor deposition, physical vapor deposition, electrophoretic deposition, electrostatic deposition, preceramic polymer pyrolysis, sol-gel, slurry coating, dipping, air-brushing, sputtering, slurry painting, high velocity oxygen fuel processes, low pressure plasma spray processes, and the like.

Next, the article 104 may be heat treated (step 32). In one embodiment, the article 104 may be heat treated in an inert atmosphere, such as argon, under vacuum to form the healing silica matrix and metallic, intermetallic, or metal silicide network. The silica based material, oxygen scavenger, and optional alkaline earth material form a healing silica based matrix with the oxygen scavenger network interwound throughout the layer of the healing silica matrix. The heat treatment may be performed by any of a number of conventional techniques. The heat treatment temperature depends on the constituents, and may range from 932 F (500 C) to 3,000 F (1650 C). In one example, the article 104 may be heat treated in a temperature range of 2012 F (1100 C) to 2552 F (1400 C) for a period of time sufficient to form the healing silica matrix and metallic, intermetallic, or metal silicide network. More specifically, the article 104 may be heat treated for 8 hours at 2102 F (1150 C) under vacuum.

The silicide based material network can be formed by sintering a uniform composition of silicide based materials or by reacting single or multiple metal constituents with silicon and metal borides under an inert atmosphere at a temperature below the melting temperature of silicon (e.g., about 2550 F; 1400 C). In some silicide based materials, chemical reactions may occur between the metals, intermetallic, or metal silicide/borides (oxygen scavenger) and the components in the silica matrix materials at temperatures higher than 1150 C in inert atmosphere to form gaseous products such as SiO(g). The heat treatment temperatures, therefore, should be below the reaction temperature 2190 F (1200 C) to form healing silica based matrix only and avoid bond coat decomposition.

A second heat treatment in air at temperatures higher than 2732 F (1500 C) may be required to form the silicide based material network. In some embodiments, the second heat treatment is in air, to form the silicide based material network when the first heat treatment in inert atmospheric is below 2732 F (1500 C). Not all the compositions need a second heat treatment in air, for example, when the first heat treatment were conducted at temperatures below 1350 C and the metal silicide would not otherwise form continuous network. The silicide based materials sinter and form an interconnected network within the healing silica matrix formed during the prior heat treatment in air at temperature in the range of 2372 F-3002 F (1300 C-1650 C). This heat treatment in air avoids the formation of gaseous reaction products such as SiO (g) between silicide and silica based matrix. The healing silica matrix formed during the prior heat treatment surrounds and coats the oxygen scavenger surface and protects it from oxidation during heat treatment in air.

The silicide based material network is formed through sintering of metal, intermetallic, or metal silicide particles. The silica formed on the surface is dense and can protect the silicide based material from being quickly consumed thereby increasing the longevity of the oxidation resistant bond coat layer. In one example, metal borides may be incorporated into the silicide based material network. The metal borides may also reside in the silica based matrix, outside of the network. Alternatively, the silicide based material network can be produced by silicide forming precursors, along with silica containing matrix constituents. The metals react with the silicon and boron/boride during heat treatment to form the metal, intermetallic, or metal silicide network that is embedded in the healing silica matrix.

The silica based matrix operates as a sealant to slow oxygen diffusion and protect the metal silicide from rapidly oxidizing. Some silicide based materials, such as molybdenum disilicide, can oxidize relatively quickly at 930-1650 F (500-900 C) due to insufficient formation of a protective scale such as silica at this temperature range. The silica based matrix provides protection in this temperature range and contains the glass phases (e.g., borosilicate glass, alkaline earth aluminum silicate glass, etc.) to provide the healing during engine operation. Various top coat layers with varying compositions can be applied to achieve a desired environmental protection and thermal expansion match among the substrate, the oxidation protection coating, and the top coat.

The glass phases in silica based materials exhibit a viscosity of $10^2$ poise to $10^7$ poise in a temperature range of 1292 F (700 C) to 3272 F (1800 C), to form a viscous glass material, that when heat treated, is suitable to heal cracks in the oxidation resistant bond coat. The composite bond coat containing metallic or intermetallic network and silica based matrix has a rigid structure to resist creep at high temperatures. The oxidation resistant bond coat layer provides oxidation resistance by providing a barrier to oxygen flow to the article's surface, reacting with oxygen when small amount of oxygen diffused into the bond coat and healing of the bond coat cracks. In addition, as the oxidation resistant bond coat layer is exposed to oxidative operating conditions overtime, the oxidation resistant bond coat degrades and exposes the oxygen scavenger additive. The oxygen scavengers oxidize to form non-gaseous oxidation products such as metal oxides and $SiO_2$, $Al_2O_3$, $B_2O_3$, etc.

The Silicon dioxide ($SiO_2$) is dense and protects the oxidation scavengers from further oxidation. Boron trioxide ($B_2O_3$) forms borosilicate glass phases and flows at elevated temperature to seal cracks and regenerates the glass phases in the silica based matrix, therefore prolong the life of the oxidation protective bond. The composite bond coat containing the metallic or intermetallic network and healing silica based matrix accommodate mismatches of the coefficient of thermal expansion of the articles and metallic or intermetallic materials in the bond coat layer. As a result, the oxidation resistant bond coat layer resists spallation and cracking.

With reference again to FIG. 2, the article 104 may represent any component, part of a component, etc., that requires protection from oxidation across a temperature range up to 3,000 F (1,650 C). Such articles may include, but are not limited to, turbine engine components such as vanes, blades, nozzles, flaps, seals, shrouds, and the like, hypersonic engine components such as leading edges and heat exchangers, and hypersonic components such as hypersonic airfoil surfaces, and the like.

The article 104 may be manufactured of any suitable material, such as, for example, silicon-containing articles to include but not be limited to, silicon-containing ceramics, silicon-containing metal alloys, etc. Suitable silicon-containing ceramics include, but are not limited to, silicon nitride, silicon carbide, silicon carbonitride, silicon oxycarbides, silicon carbide composites, silicon nitride composites, silicon oxynitrides, silicon aluminum oxynitrides, silicon nitride ceramic matrix composites, etc. Suitable silicon-containing metal alloys include, but are not limited to, molybdenum silicon alloys, niobium silicon alloys, iron silicon alloys, cobalt silicon alloys, nickel silicon alloys, tantalum silicon alloys, refractory metal silicides, etc. The article 104 may alternatively be manufactured of ceramic matrix composites, for example, ceramic fibers embedded in a ceramic matrix, thus forming a ceramic fiber reinforced ceramic. The matrix and fibers can comprise any ceramic material, whereby carbon and carbon fibers can also be considered a ceramic material.

A metallic, intermetallic, or metal silicide network 142 and a healing silica matrix 144 are combined together in the resultant environmental barrier coating 120 to provide maximum oxidation protection for the article 104. The metallic, intermetallic, or metal silicide network 142 is embedded in the healing silica matrix 144 such that the environmental barrier coating 120 readily binds to the article 104. This provides stability against blow off and creep under high surface gas velocities and the forces generated in a gas turbine engine application. The structural network of the silicide is adhered so that the glass in the coating does not blow off when molten. The network contains the glass.

The oxygen scavenger reacts with oxygen diffused into the oxygen resistant coating 120 and removes the oxygen. The oxygen scavengers dispersed throughout the environmental barrier coating 120 circumvent potential problems associated with coefficient of thermal expansion mismatches which may result in spallation and cracking. That is, the oxygen scavenger stops oxygen from reaching the article 104.

During engine operation, the environmental protective top coat layer 130 may become exposed to oxidative operating conditions such that the environmental protective top coat layer 130 may degrade as micro-cracks 150 are formed. The oxygen scavengers of the healing silica matrix 144 form non-gaseous oxidation products such as metal oxides and $SiO_2$, $Al_2O_3$, $B_2O_3$, metal silicates, etc. The oxygen scavengers of the healing silica matrix 144 within the oxygen resistant coating 120 migrate at elevated temperature, to repair the micro-cracks 150.

Example components in hypersonic and/or gas turbine applications require environmental protection in different conditions that may or may not include water vapor. For example, scramjet engine leading edges require dry oxidation resistance up to and greater than 3,000 F (1,650 C) while cooled CMC flow path components, e.g., heat exchangers, require protection under relatively high water vapor conditions. The environmental protective top coat layer 130 provides environmental protection against such water vapor attack at high temperatures. Multiple layers may provide additional protection against steam and may be used to modify the heat flux through the oxidation resistant bond coat layers, e.g., modify emissivity, reflectance, etc.

The oxidation resistant bond coat layer 120 protects materials from oxidation in a range of temperatures from room temperature to up to at least 3000 F (1650 C) and greater. The oxidation resistant bond coat layer 120 provides a metal silicide network in a healing matrix. The interstices between the metal silicide network is filled with and coated by silica based healing matrix containing glass phases to protect the substrate and provide the healing function. In embodiments, there is minimal porosity in the oxidation resistant bond coat layer 120.

The metal silicide network and the glass containing silica based healing matrix, are interwound. The glass phases in the silica healing matrix melt at high temperature to seal cracks formed and heal the bond coat. This provides a stable coating at high temperature that prolongs service life. The healing matrix may be somewhat rigid to maintain a stable coating structure. Although especially applicable to low thermal expansion composite substrates such as C/SiC, SiC/SiC or SiC/SiNC and monolithic $Si_3N_4$, the architecture of the oxidation resistant bond coat layer 120 is also applicable to other materials requiring oxidation protection over a broad temperature range to ensure optimal performance. The coefficient of thermal expansion (CTE) of the oxidation resistant bond coat layer 120 can be adjusted by varying the volume fraction and type of the metal silicide or other metallic or intermetallic network and healing silica or other glassy matrix to minimize coefficient of thermal expansion mismatch between the layers of the oxidation resistant bond coat layer.

The oxidation resistant bond coat layer 120 provides oxidation resistance by providing a barrier to oxygen flow to the article surface, reacting with oxygen when small amount of oxygen diffused into the bond coat. In addition, as the oxidation resistant bond coat layer 120 is exposed to oxidative operating conditions over time, the oxidation resistant bond coat degrades and exposes the oxygen scavenger additive. The oxygen scavengers additive oxidize to form non-gaseous oxidation products such as metal oxides and $SiO_2$, $Al_2O_3$, $B_2O_3$, etc. The $SiO_2$ is dense and protects the oxidation scavengers from further oxidation. $B_2O_3$ forms borosilicate glass phases and flows at elevated temperature to seal cracks and regenerates the glass phases in the silica based matrix to prolong the life of the environmental barrier coating 100.

The multi-component coating is operable to protect advanced structural materials at elevated temperatures associated with efficient turbine operation. Thermal spray methods are a cost-effective and robust method of fabricating coatings on complex shaped components.

Although the different non-limiting embodiments have specific illustrated components, the embodiments of this application are not limited to those particular combinations. It is possible to use some of the components or features from any of the non-limiting embodiments in combination with features or components from any of the other non-limiting embodiments.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A coated article, comprising:
   an article having a surface; and
   an oxidation resistant bond coat layer deposited on the surface, the oxidation resistant bond coat layer comprising a metal silicide phase, a crystalline ceramic phase and an amorphous ceramic phase, wherein the metal silicide phase has an aspect ratio greater than 1:1 but less than 50:1.

2. The coated article as recited in claim 1, wherein the metal silicide phase and the crystalline ceramic phase each have an aspect ratio greater than 3:1.

3. The coated article as recited in claim 1, wherein the metal silicide phase and the crystalline ceramic phase each have an aspect ratio greater than 5:1.

4. The coated article as recited in claim 1, wherein a volume fraction of the metal silicide phase ranges between 20-80 vol. %, a volume fraction of the crystalline ceramic phase is 25-75 vol. %, and a volume fraction of the amorphous ceramic phase ranges between 1-30 vol. %.

5. The coated article as recited in claim 1, wherein a volume fraction of the metal silicide phase is 60 vol. % $MoSi_2$, a volume fraction of the crystalline ceramic phase is 25 vol. % $HfSiO_4$, and a volume fraction of the amorphous ceramic phase is 15 vol. % boro-silicate glass where the glass has the composition $(Si_{0.75}B_{0.15}Al_{0.05}Na_{0.05})O_2$ with porosity less than 10%.

6. The coated article as recited in claim 1, wherein a volume fraction of the metal silicide phase is 60 vol. % $MoSi_2$, a volume fraction of the crystalline ceramic phase is 25 vol. % $HfSiO_4$, and 5% $HfB_2$; and a volume fraction of the amorphous ceramic phase is 10 vol. % boro-silicate glass where the glass has the composition $(Si_{0.75}B_{0.15}Al_{0.05}Na_{0.05})O_2$ with porosity less than 10%.

7. The coated article as recited in claim 1, further comprising an environmental protective top coat layer disposed upon the oxidation resistant bond coat layer, whereby the oxidation resistant bond coat layer is operable to repair a crack in the environmental protective top coat layer during operation of the coated article.

8. The coated article as recited in claim 1, wherein the metal silicide phase has an aspect ratio greater than 3:1.

9. The coated article as recited in claim 1, wherein the metal silicide phase has an aspect ratio greater than 5:1.

* * * * *